(12) United States Patent
Donderici et al.

(10) Patent No.: US 9,341,053 B2
(45) Date of Patent: May 17, 2016

(54) MULTI-LAYER SENSORS FOR DOWNHOLE INSPECTION

(71) Applicant: Halliburton Energy Services, Inc., Houston, TX (US)

(72) Inventors: Burkay Donderici, Houston, TX (US); Luis San Martin, Houston, TX (US); Daniel Edgardo Viassolo, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/440,399

(22) PCT Filed: Sep. 30, 2014

(86) PCT No.: PCT/US2014/058370
§ 371 (c)(1),
(2) Date: May 4, 2015

(87) PCT Pub. No.: WO2015/050884
PCT Pub. Date: Apr. 9, 2015

(65) Prior Publication Data
US 2015/0285057 A1 Oct. 8, 2015

Related U.S. Application Data

(60) Provisional application No. 61/886,357, filed on Oct. 3, 2013.

(51) Int. Cl.
*E21B 47/00* (2012.01)
*G01V 3/30* (2006.01)
*E21B 47/10* (2012.01)
*G01V 11/00* (2006.01)

(52) U.S. Cl.
CPC .............. *E21B 47/00* (2013.01); *E21B 47/102* (2013.01); *G01V 3/30* (2013.01); *G01V 11/00* (2013.01)

(58) Field of Classification Search
CPC ......... E21B 47/00; E21B 47/102; G01V 3/30; G01V 11/00
USPC ....................................................... 73/152.54
See application file for complete search history.

(56) References Cited

U.S. PATENT DOCUMENTS

| | | |
|---|---|---|
| 4,292,589 A | 9/1981 | Bonner |
| 5,793,206 A | 8/1998 | Goldfine |
| 5,869,767 A | 2/1999 | Hayward et al. |
| 6,614,360 B1 * | 9/2003 | Leggett, III ............. E21B 44/00 340/853.1 |
| 6,727,706 B2 | 4/2004 | Gao et al. |

(Continued)

OTHER PUBLICATIONS

International Search Report and Written Opinion issued in related PCT Application No. PCT/US2014/058370 mailed Jan. 9, 2015, 9 pages.

*Primary Examiner* — Hezron E Williams
*Assistant Examiner* — Rodney T Frank
(74) *Attorney, Agent, or Firm* — Benjamin Fite; Baker Botts L.L.P.

(57) ABSTRACT

An example downhole tool includes a tool body and a multi-layer sensor coupled to the tool body. The multi-layer sensor may include a first transmitter coupled to a first conformable element and a first receiver coupled to a second conformable element. One of the first conformable element and the second conformable element may overlay the other of the first conformable element and the second conformable element.

20 Claims, 6 Drawing Sheets

(56) References Cited

U.S. PATENT DOCUMENTS

| | | |
|---|---|---|
| 7,567,649 B1 | 7/2009 | Safai et al. |
| 8,956,418 B2* | 2/2015 | Wasielewski ............ A61B 5/03 600/309 |
| 2002/0167418 A1 | 11/2002 | Goswami et al. |
| 2004/0257912 A1* | 12/2004 | Dubinsky ................ G01V 1/44 367/81 |
| 2005/0034917 A1* | 2/2005 | Mathiszik ................ G01V 1/44 181/108 |
| 2005/0078555 A1* | 4/2005 | Tang ........................ G01V 1/44 367/31 |
| 2005/0146334 A1* | 7/2005 | Chen ........................ G01V 3/28 324/338 |
| 2005/0212520 A1* | 9/2005 | Homan .................... G01V 3/30 324/338 |
| 2007/0284112 A1 | 12/2007 | Magne et al. |
| 2008/0224707 A1* | 9/2008 | Wisler ..................... G01V 3/28 324/338 |
| 2008/0271926 A1* | 11/2008 | Coronado ............. E21B 17/026 166/66 |
| 2010/0194374 A1* | 8/2010 | Trumper ................. B82Y 35/00 324/72 |
| 2014/0111154 A1* | 4/2014 | Roy ........................ G01V 3/081 320/108 |
| 2014/0298900 A1* | 10/2014 | Clarke .................... E21B 49/00 73/152.55 |
| 2015/0218941 A1* | 8/2015 | Clarke .................... E21B 47/00 324/324 |
| 2015/0337649 A1* | 11/2015 | Donderici ................ G01V 3/26 340/854.5 |
| 2015/0338542 A1* | 11/2015 | Donderici ............... G01V 3/26 702/7 |

* cited by examiner

MULTI-LAYER SENSORS FOR DOWNHOLE INSPECTION

CROSS-REFERENCE TO RELATED APPLICATION

The present application claims priority to U.S. Provisional Patent Application No. 61/886,357, filed Oct. 3, 2013 and titled "Multi-Layer Sensors For Downhole Inspection" and is a U.S. National Stage Application of International Application No. PCT/US2014/058370 filed Sep. 30, 2014, both of which are incorporated herein by reference in their entirety for all purposes.

BACKGROUND

The present disclosure relates generally to downhole drilling and hydrocarbon production operations and, more particularly, to multi-layer conformable sensors for downhole inspection. The present disclosure relates generally to downhole drilling operations and, more particularly, to downhole inspection with ultrasonic sensor and conformable sensor responses. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain operations, measurements of downhole elements within the wellbore may be generated, including measurements of a casing within the wellbore. Typically, those measurements are limited with respect to their granularity, and small features within the wellbore may not be identifiable through the measurements. Moreover, the casing can interfere with measurements intended to identify elements outside of the casing.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
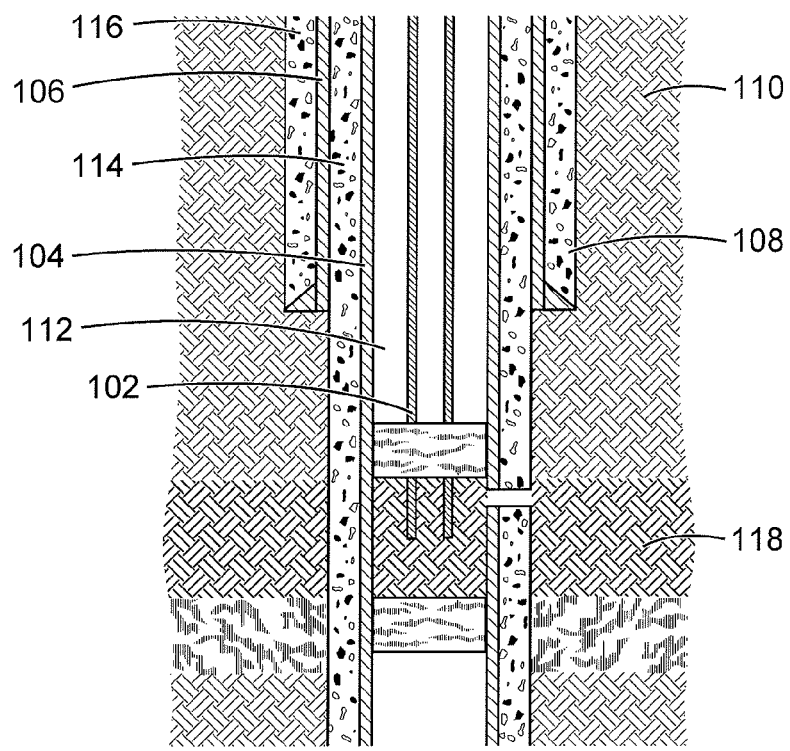
FIG. 1 is a diagram of an example production environment with multiple, concentric casings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to multi-layer conformable sensors for downhole inspection.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and timeconsuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 1 is a diagram of an example production environment and illustrates casings 102, 104, and 106 disposed within a borehole 108 in a rock formation 110. The casings 102-104 may be concentric or nearly concentric and secured within the borehole 108 and each other through cement layers 112, 114, and 116. The center casing 102 may comprise a production casing where hydrocarbon from the formation strata 118 is received at the surface (not shown).

The casings 102-106 may serve numerous purposes within a production and drilling environment, including preventing the borehole 108 from collapsing after it is drilled and while it is being drilling, protecting a water table in the formation 110 from contamination, and maintaining pressure within the borehole 108. Accordingly, damage to the integrity of the casings 102-106 is problematic. Common damage to the casings includes crack and corrosion, which can be an indication of a defective cement bond between a casing and the borehole wall. Downhole measurements may be used to survey the casings 102-106 to identify damage.

According to aspects of the present disclosure, a downhole tool with at least one multi-layer sensor may be positioned in either an open hole (non-cased) environment, or in a cased environment like the one shown in FIG. 1, and may generate measurements of the downhole environment from which images of certain downhole elements can be generated. Example downhole elements include downhole pipes, cement layers, boreholes, and formations. In certain embodiments, the multi-layer sensor may comprise a conformable sensor. As used herein, conformable sensors may comprise planar sensors that are printed or disposed on a flexible material that can conform to the shape of a surface with which it is in contact. Multi-layer conformable sensors may provide high resolution, azimuthally sensitive and diverse measurements by using multiple sensors in close proximity in a layered, planar structure.

Figure 2:
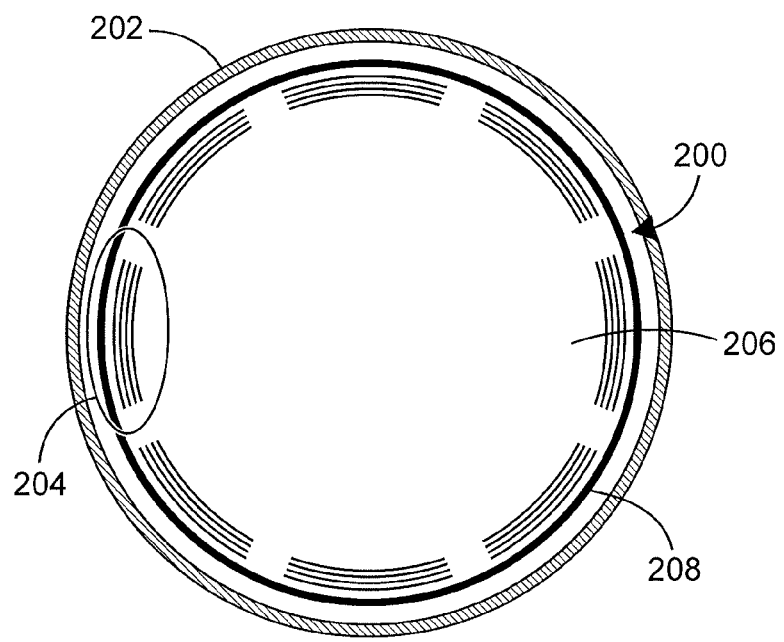
FIG. 2 is a diagram of an example downhole tool with multi-layer conformable sensors, according to aspects of the present disclosure.

FIG. 2 is a diagram of an example downhole tool 200 with at least multi-layer sensor. The downhole tool 200 is shown deployed in a pipe 202, which may be a downhole casing. In certain embodiments, the downhole tool 200 may comprise a wireline survey or measurement tool that can be introduced into an open hole (non-cased) environment, a cased environment, or within the bore of a drill string in a conventional drilling assembly. In certain embodiments, the downhole tool 200 may be included in a LWD/MWD segment of a bottom hole assembly (BHA) in a conventional drilling assembly. The tool 200 may be physically and/or communicably coupled to a control unit (not shown) at the surface through a wireline or slickline, or any other conveyance, or through a downhole telemetry systems, such as a mud pulse telemetry system. The tool 200 may also comprise a control unit that is communicably coupled to the sensors of the tool. As used herein, a control unit may include an information handling system or any other device that contains at least one processor communicatively coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one multi-layer sensor 204 may be coupled to a tool body 206 of the downhole tool 200. In the embodiment shown, the multi-layer sensor 204 comprises a stacked antenna array, with each layer comprising at least one antenna winding. The multi-layer sensor 204 may comprise at least one layer with an antenna winding or transmitter to create an electromagnetic (EM) field in a target, in this case the pipe 202, and at least one layer with an antenna winding or receiver to measure a current response in the pipe 202 to the magnetic field. The antenna windings of each layer of the multi-layer sensor 204 may be disposed or printed on different pieces of a flexible material or surface, with the flexible materials overlaid to form the multi-layer sensor 204. The resolution of the measurements taken by the multi-layer sensor 204 increases as the "stand-off" distance between the multi-layer sensor 204 and the pipe 202 decreases.

In the embodiment shown, multi-layer sensors are positioned in an azimuthal array around the downhole tool 200. In particular, the multi-layer sensors are positioned at locations around the tool to generate measurements covering the entire circumference of the pipe 202. The number of multi-layer sensors in the azimuthal array may be increased or decreased to provide a more or less robust measurement, respectively, of the pipe. Additionally, in certain embodiments, rather than an azimuthal array, a single, elongated multi-layer sensor may be wrapped around the circumference of the tool 200 to generate measurements covering the entire circumference of the pipe 202. Additionally, one or more azimuthal arrays may be positioned at different axial locations along the tool 200 such that axial and radial arrays are present.

In certain embodiments, the multi-layer sensors may be protected by a sleeve 208. The flexible material on which the layers of the multi-layer sensors are disposed may be sensitive to downhole conditions, and a protective coating, made of a material such as Teflon, may reduce wear on multi-layer sensors and prolong their use downhole. In certain embodiments, instead of a single sleeve, each of the multi-layer sensors may be protective by a separate protective covering.

Other embodiments of a downhole tool with at least one multi-layer sensor are possible. For example, the multi-layer sensor 204 may be incorporated into a rotating portion of the tool 200 to scan around the circumference of the pipe 202. Additionally, the multi-layer sensor 204 may be disposed on a pad (not shown) that is coupled to and extendable from the tool body 206 through spring mechanisms or motorized arms (not shown) to contact the pipe 202 or a borehole wall. Positioning the multi-layer sensor 204 closer to the pipe 202 will reduce the stand-off distance between the sensor 204 and the pipe 202, resulting in a higher resolution measurement. In certain embodiments, multi-layer sensors may also be arranged in both longitudinal and horizontal array on the tool body 218.

In use, the downhole tool 200 may generate high resolution, azimuthal measurements of the pipe 202 by transmitting a time-varying EM signal from a transmitter layer within the multi-layer sensor 204. The EM signal may generate eddy currents in the pipe 202. The eddy currents may generate secondary currents that contain information about the pipe 202, and the secondary currents may be measured at one or more receiver layers of the multi-layer sensor 204. Notably, the distance between the transmitters and receivers affects both the resolution and depth of investigation of the resulting measurements. Accordingly, the measurements taken with transmitters and receivers in a single sensor will provide very high resolution measurements of elements in contact with the sensors. In certain embodiments, receivers and transmitters from different sensors of the downhole tool 200 may be used to generate deeper measurements. These deeper measurements may have lower resolution but provide measurements for remote elements, such as casings outside of the casing 202, in a multi-casing environment.

Figure 3:
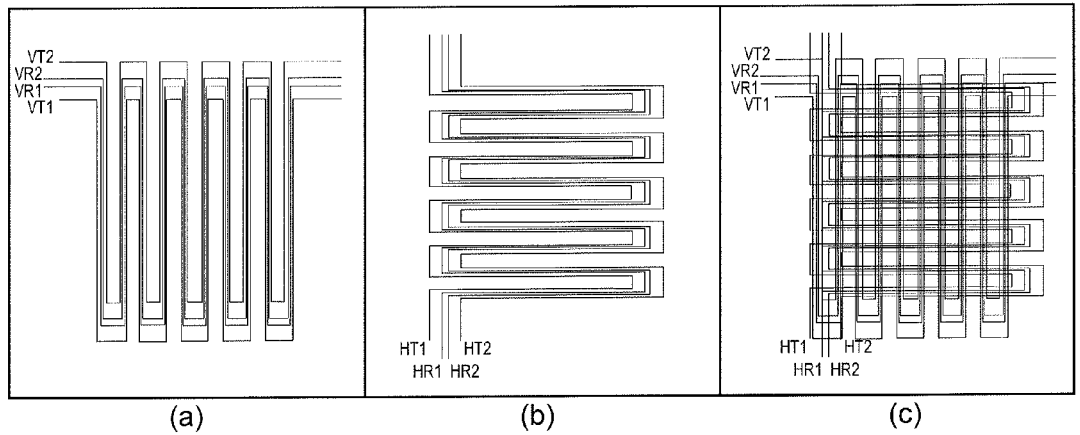
FIG. 3 is a diagram of example antenna windings for a multi-layer conformable sensor, according to aspects of the present disclosure.

FIG. 3 is a diagram of three example antenna layer configurations for a multi-layer conformable sensor, according to aspects of the present disclosure. Configuration (a) comprises two vertical transmitters VT1 and VT2 and two vertical receivers VR1 and VR2. In certain embodiments, each of the transmitters VT1 and VT2 and the receivers VR1 and VR2 may be disposed on a separate flexible surface or material. In other embodiments, the transmitters VT1 and VT2 may be disposed on one flexible surface and the receivers VR1 and VR2 may be disposed on another flexible surface. As can be seen, the two vertical transmitters VT1 and VT2 and two vertical receivers VR1 and VR2 may be overlaid in a generally meandering pattern, where the receivers VR1 and VR2 are disposed within the windings of the transmitters VT1 and VT2 at generally symmetric distances.

Configuration (b) comprises a similar configuration to the one shown in configuration (a) except that the antennas may be arranged in a horizontal direction. In particular, configuration (b) comprises two horizontal transmitters HT1 and HT2 and two horizontal receivers HR1 and HR2. As with configuration (a), each of the transmitters and receivers may be disposed on a separate layer, or the receivers may be disposed on one layer and the transmitters disposed on another. The horizontal orientation may produce measurement results corresponding to a different orthogonal direction than the vertical orientation.

Configuration (c) comprises the transmitter and receiver windings from configurations (a) and (b) overlaid at a single location. In certain embodiments, the vertical and horizontal receivers may be triggered sequentially, providing measurements in both the vertical direction and horizontal direction at a single aziumthal location over a particular time period. In certain embodiments, other layers can be added, including tilted layers that do not correspond directly to a vertical or horizontal direction. Additionally, the meandering, symmetrical patterns can be changed to other patterns, such as spirals, within the scope of this disclosure.

Figure 4:
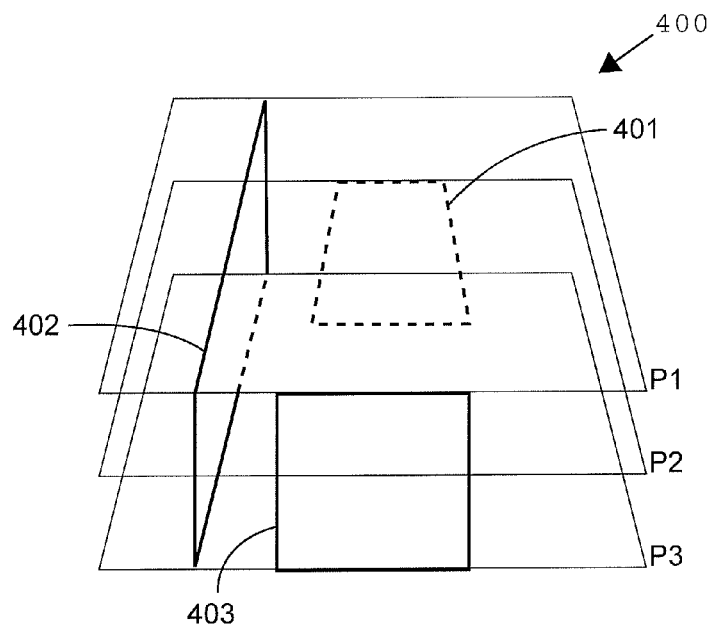
FIG. 4 is a diagram of other example antenna windings for a multi-layer conformable sensor, according to aspects of the present disclosure.

FIG. 4 is a diagram of another example multi-layer sensor 400, according to aspects of the present disclosure. Multi-layer sensor 400 may comprise at least one receiver winding that spans multiple layers. In particular, multi-layer sensor 400 comprises three layers P1, P2, and P3 and three separate antenna winding 401-403, each arranged in a different orthogonal direction—Hz, Hy, and Hx', respectively. At least one of the windings 401-403 may comprise portions located on more than one layer. Winding 402, for example, comprises portions on all three layers, which may be linked when the layers are overlaid to form a multi-layer sensor. In certain embodiments, the windings 401-403 may be used to independently measure the different orthogonal components of secondary currents generated within a target, increasing the amount of information measured per azimuthal position of the target.

Figure 5:
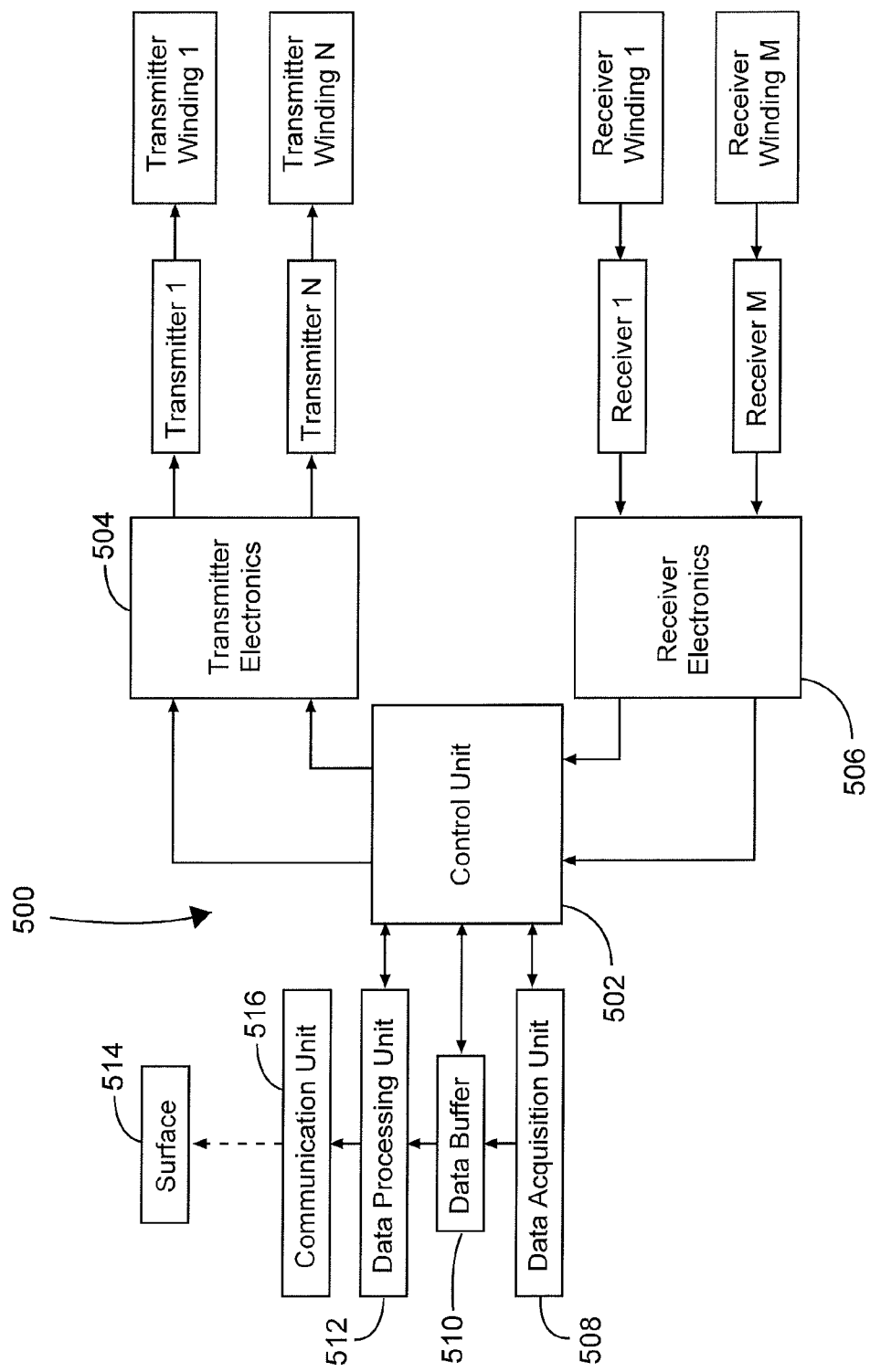
FIG. 5 is a diagram of an example control system for a downhole tool with multi-layer conformable sensors, according to aspects of the present disclosure.

In certain embodiments, a downhole tool with multi-layer sensors may comprise a control system to control when and how the signals are transmitted and the responses are measured. FIG. 5 is a diagram of an example control system 500 for a downhole tool with a conformable sensor, according to aspects of the present disclosure. The system 500 comprises a control unit 502 that may function as the primary controller for the tool and may be communicably coupled to transmitters 1-N through transmitter electronics 504 and to receivers 1-M through receiver electronics 506. The transmitters 1-N and receivers 1-M may comprise elements of a multi-layer sensor or an array of multi-layer sensors. The transmitter electronics 504 and receiver electronics 506 may comprise circuit boards to which some or all of the transmitters 1-N and receivers 1-M are coupled.

The control unit 502 may trigger the transmitter electronics 504 to generate a time-varying EM signal through one or more of the transmitters 1-N. The time-varying EM signal may be a sinusoidal signal, its phase and amplitude set at a desired value. As is described above, the signals generated through the transmitters 1-N may be coupled to and generate eddy currents in the pipe or borehole adjacent to the downhole tool, and the eddy currents may generate secondary currents that contain information about the pipe or borehole. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 502 may receive the measurements from the receivers 1-N through the receiver electronics 506 and may transmit the measurements to the data acquisition unit 508. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 508, the measurements may be digitized, stored in a data buffer 410, pre-processed at data processing unit 412, and sent to the surface 414 through a communication unit 416, which may comprise a downhole telemetry system.

In certain embodiments, the control system 500, and in particular the control unit 502 may be responsible for controlling the pairs of transmitters and receivers from the multi-layer conformable sensors that generate measurements. In certain embodiments, the control system 500 may select transmitter and receiver pairs that provide sufficient depth of investigation to measure remote casings or pipes. The control unit 502 may include instructions regarding the transmitter and receivers pairs to use in given circumstances, and may generate control signals to the transmitter electronics and receiver electronics based, at least in part, on the instructions. For example, the control unit 502 may include instructions for shallow measurements using co-located or closely located transmitters and receivers and for deep measurements using transmitters and receivers located farther away from each other.

According to aspects of the present disclosure, the measurements from the multi-layer conformable sensors of the downhole tool may be aggregated and processed to produce a visualization of the downhole elements surveyed or measured by the downhole tool. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. In certain embodiments, aggregating and processing the measurements may comprise aggregating and processing the measurements using an inversion algorithm implemented as a set of instructions in the control unit that are executable by a processor of the control unit to perform data calculations and manipulations necessary for the inversion algorithm. The inversion algorithm may be specific to the environment in which the downhole tool is used (cased or open hole) and may be designed to calculate downhole parameters unique to the environment.

Figure 6:
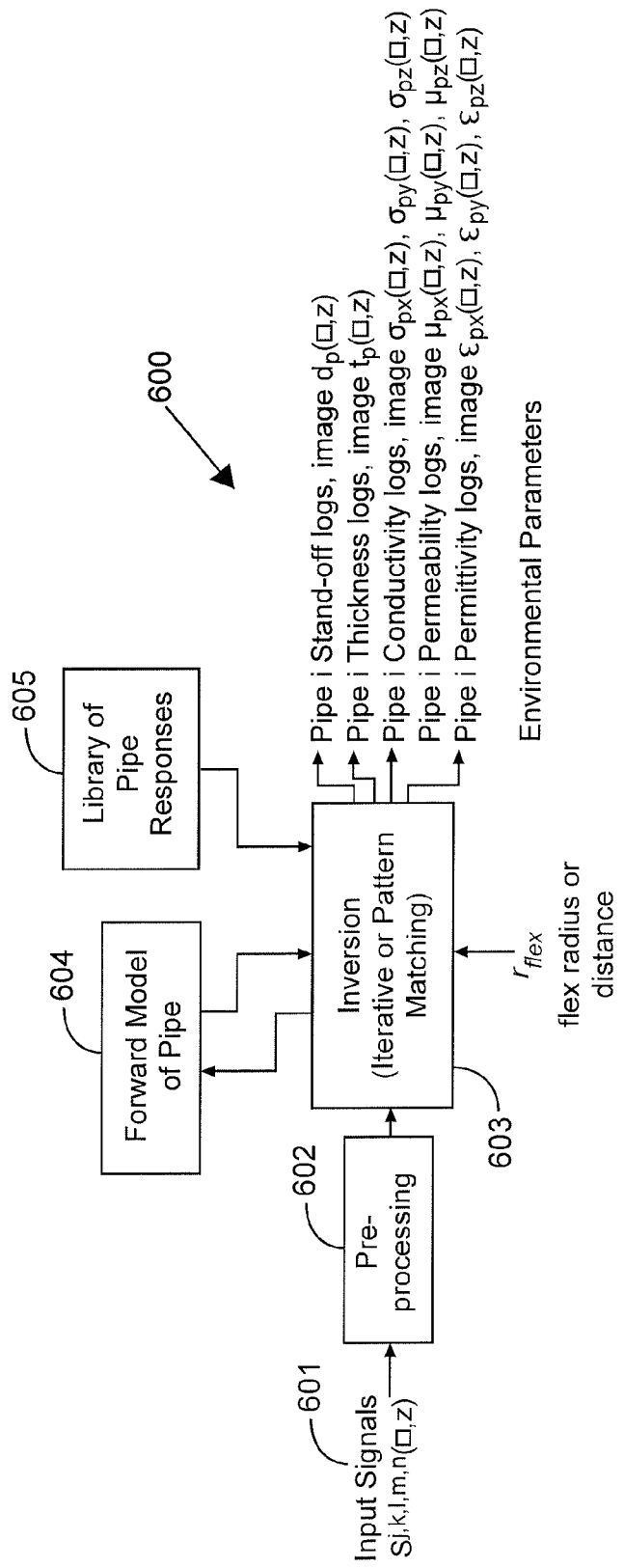
FIG. 6 is a block diagram of an example inversion algorithm, according to aspects of the present disclosure.

FIG. 6 is a block diagram on an example inversion algorithm for a downhole environment with one or more casings or pipes, according to aspects of the present disclosure. An input signal 601 may comprise measurements from the receivers of the downhole tool, including the receivers of the multi-layer sensors. In certain embodiments, the input signals may be divided into time components and may be identified by the receiver which made the measurement and the transmitter that generated the eddy current/secondary current measured by the receiver. The measurements may also be identified by the pipe to which they correspond, when measurements on multiple casings are taken.

The inversion algorithm may comprise a pre-processing block 602, which may receive the input signals 601. The pre-processing block 602 may process the input signals to compensate for downhole conditions or to convert the input signals to a form usable within the inversion block 603. For example, the pre-processing block 602 may process the measurements to calibrate for temperature effects, convert between frequency to time domain, convert between complex-value to phase and amplitudes, and/or to remove noise by filtering in azimuth or depth.

The inversion algorithm further may comprise an inversion block 603, which may receive and process the signals from the pre-processing block 602 to determine parameters for one or more of the pipes in the downhole environment. In certain embodiments, the inversion block 603 may receive a model 604 of a downhole environment with one or more pipes. The inversion block 603 may implement a cost function to determine pipe parameters that produce the minimum mismatch between the model 604 and the input signals 601. The cost function may be defined, for example, by utilizing least squares minimization through $L_2$ norm. The inversion block 603 may output the pipe parameters.

In certain embodiments, a library 605 of pipe responses to different signals can be used instead of or in addition to the model 604. For example, the library 605 may be used if the parameter dimensions of the pipe responses are low in number and also small in range, so that an accurate library can be calculated. If library 605 is used, a multi-dimensional interpolation can be used to obtain the pipe parameters closest to the measurements reflected in the input signal 601.

The inversion block 603 may output one or more parameters of the pipes measured by the downhole tool. The parameters may comprise physical parameters, such as the stand-off distances between the sensors and the pipes and the thicknesses of the pipes, as well as electrical parameters of the pipes, such as conductivity, permeability, and permittivity. Notably, the use of multi-layer sensors allows for a large number of independent measurements to be used to solve for bi-axial or uni-axial anisotropy in the conductivity, permeability or permittivity parameters of the pipes. Visualizations of the downhole elements can be generated based, at least in part, on the determined parameters and used to identify features of the pipes, such as cracks or corrosion. Notably, because of the resolution of the multi-layer conformable sensors, the resulting visualizations may have high resolution and azimuthal sensitivity, indicating very small changes in the pipe parameters that correspond to very small features (on the order of 0.1 inches) on the pipe in direct contact with the conformable sensor.

In a multi-pipe environment, where measurements are made on more than one pipe, the resulting measurements may be indexed to identify the corresponding pipe. But the resolution of the measurements and resulting images for each pipe decreases the further the pipe is away from the conformable sensor, due to the increasing stand-off of between the pipe and the transmitters and receivers of the conformable sensors.

However, the use of multi-layer sensors provides more data points through which to better estimate parameters of the additional pipes.

In certain embodiments, the downhole tool may make measurements as it is lowered to different depths within the pipe, collecting more data points. In certain embodiments, parameters may be determined for each of these points and then combined to form a log of the casing, providing an image of the entire pipe, rather than one axial portion. Alternatively, discrete azimuthal measurements from each depth can be combined to obtain an image of the casing. In addition to the pipe parameters, certain environmental parameters, such as temperature, pipe stresses, eccentricity of the tool in the borehole or pipe can be obtained.

Figure 7:
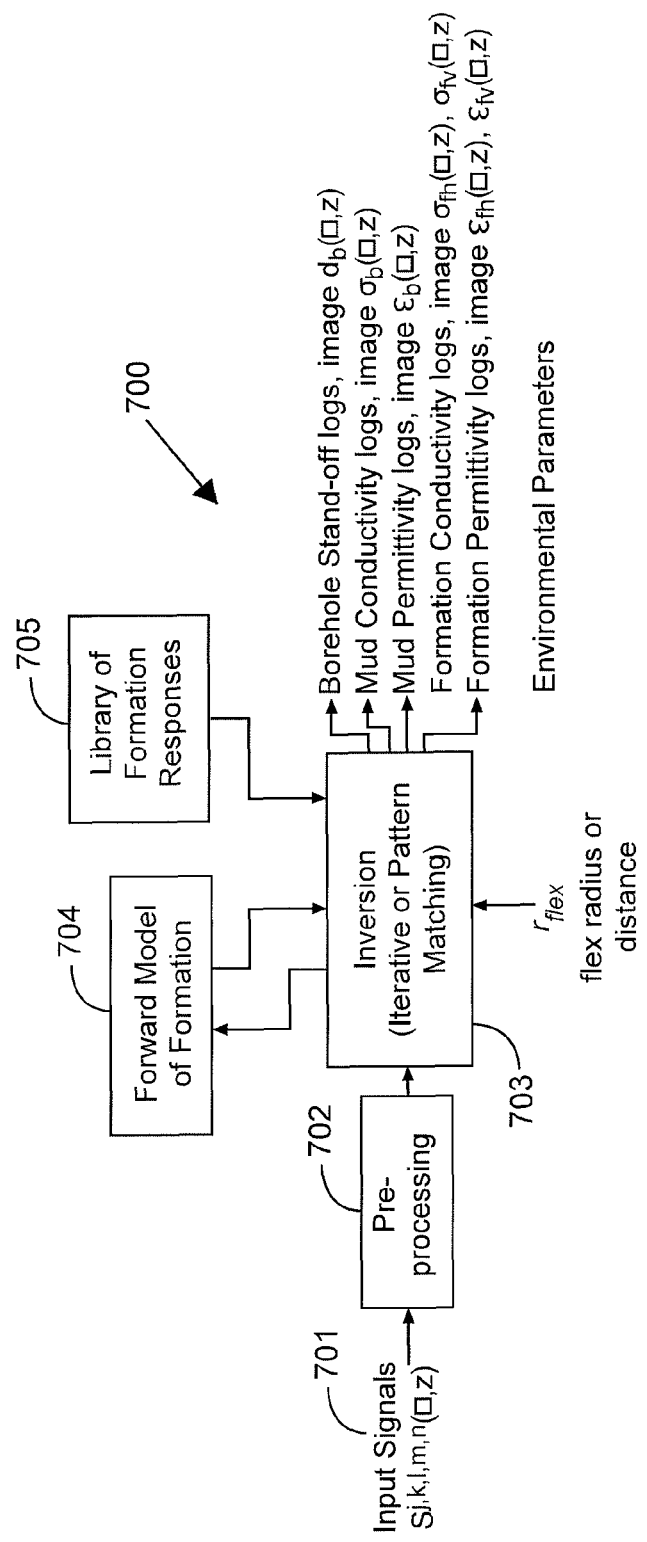
FIG. 7 is a block diagram of another example inversion algorithm, according to aspects of the present disclosure.

FIG. 7 is a block diagram on an example inversion algorithm for an open hole, non-cased environment, according to aspects of the present disclosure. As can be seen, the inversion algorithm 700 comprises similar features to inversion algorithm 600. For example, the input signals 701 and pre-processing block 702 may be similar to those described with respect to FIG. 6. The inversion block 703 may also be similar, processing the input signals 701 using a model 704 or library 705, with the model 704 or library 705 corresponding to a borehole rather than a pipe.

The inversion block 703 may output parameters specific to an open hole environment. The parameters may comprise physical parameters, such as the stand-off distances between the sensors and the pipes and the thicknesses of the pipes, as well as electrical parameters of the pipes, such as conductivity, permeability, and permittivity. Shallow measurements made using the multi-layer sensors may be used to estimate the electrical properties of drilling fluid within the borehole, and also flushed zone and mud cake in the formation. In certain embodiments, larger sensors with lower resolution can be used to minimize the borehole rugosity effects.

Like the inversion algorithm 600, the inversion algorithm 700 may output logs of parameters that may be visualized to identify features of the borehole, such as fractures. The use of multi-layer sensors allows for a large number of independent measurements that can be used to solve for bi-axial or uni-axial anisotropy in conductivity or permittivity of the borehole and surrounding formation. These anisotropic parameters can be used to better evaluate formations characteristics such as lamination.

Figure 8:
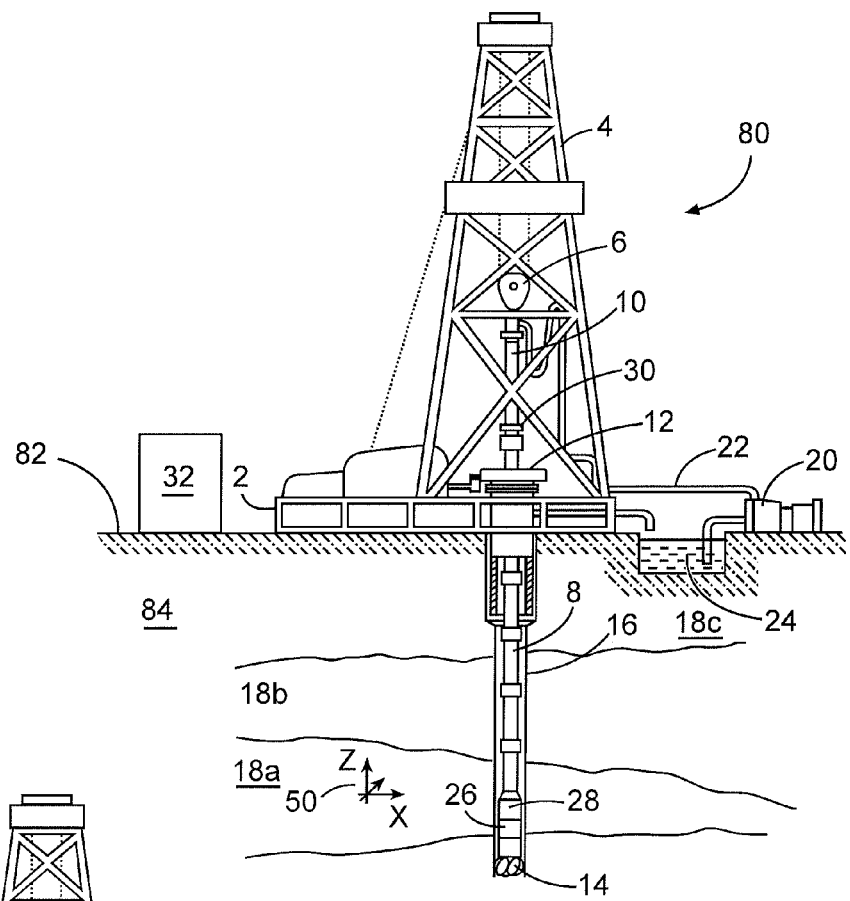
FIG. 8 is a diagram showing an illustrative logging while drilling environment, according to aspects of the present disclosure.

FIG. 8 is a diagram of a subterranean drilling system 80 incorporating a downhole tool 26 with at least one multi-layer sensor, according to aspects of the present disclosure. The drilling system 80 comprises a drilling platform 2 positioned at the surface 82. In the embodiment shown, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with at least one multi-layer sensor. As the bit extends the borehole 16 through the formations 18, the tool 26 may collect measurements relating to borehole 16 and formation the resistivity of the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

Figure 9:
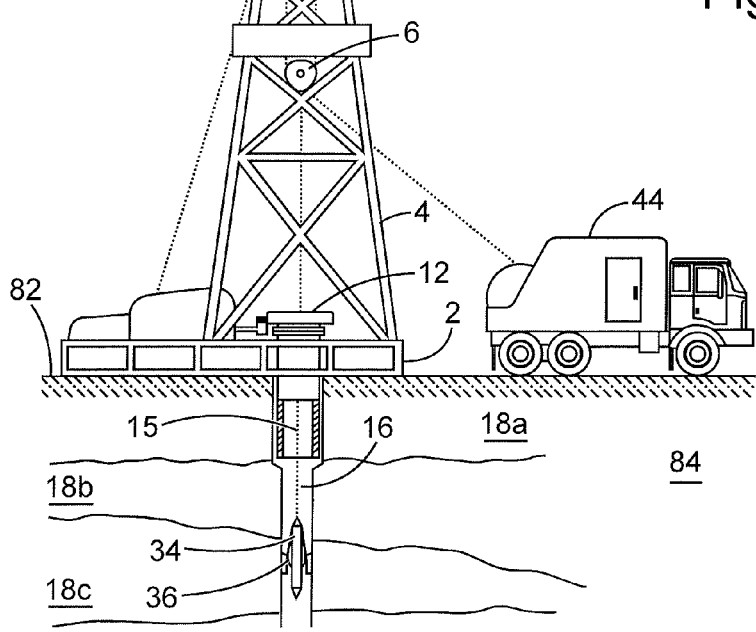
FIG. 9 is a diagram showing an illustrative wireline logging environment, according to aspects of the present disclosure.

At various times during the drilling process, the drill string 8 may be removed from the borehole 16 as shown in FIG. 9. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may comprise a downhole tool 36 with at least one multi-layer sensor, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

An example downhole tool includes a tool body and a multi-layer sensor coupled to the tool body. The multi-layer sensor may include a first transmitter coupled to a first conformable element and a first receiver coupled to a second conformable element. One of the first conformable element and the second conformable element may overlay the other of the first conformable element and the second conformable element.

In certain embodiments, the multi-layer sensor is one of wrapped around the tool body and part of an azimuthal array of multi-layer sensors coupled to the tool body. In certain embodiments, the multi-layer sensor is coupled to a pad extendable from the tool body. In certain embodiments, the sensor further comprises a second transmitter coupled to a third conformable element, and a second receiver coupled to a fourth conformable element, wherein at least one of the third conformable element and the fourth conformable element is overlaying or being overlaid by at least one of the first conformable element and the second conformable element. In certain embodiments, the first transmitter and the second transmitter are arranged in different orthogonal directions, and the first receiver and the second receiver are arranged in different orthogonal directions. In certain embodiments, the tool further comprises a second receiver or a second transmitter with portions in both the first conformable element and the second conformable element and with a different orientation than the first receiver and the first transmitter.

In any of the embodiments described in the preceding two paragraphs, the downhole may further comprise a protective sleeve covering an outer surface of the multi-layer sensor. In any of the embodiments described in the preceding two paragraphs, the downhole may further comprise a control unit with a processor and a memory device coupled to the processor, the memory device containing a set of instructions that, when executed by the processor, cause the processor to generate an electromagnetic signal using the transmitter and measure a response of a downhole element to the electromagnetic signal using the receiver. In certain embodiments, the set of instructions further cause the processor to determine a parameter of the downhole element based, at least in part, on the measured response; and generate a visualization of the downhole element based, at least in part, on the determined parameter. In certain embodiments, the downhole element comprises at least one of a casing, a borehole, a cement layer outside of the casing, or a subterranean formation.

An example method for making downhole measurement may include positioning a multi-layer sensor proximate a downhole element. The multi-layer sensor may comprise a transmitter coupled to a first conformable element, and a receiver coupled to a second conformable element, one of the first conformable element and the second conformable element overlays the other of the first conformable element and the second conformable element. An electromagnetic signal may be generated using the transmitter. A response of the downhole element to the electromagnetic signal may be measured using the receiver.

In certain embodiments, positioning the multi-layer sensor proximate the downhole element comprises one of positioning the multi-layer sensor within the borehole using a wireline or slickline, or positioning the multi-layer sensor within the borehole using a drill string. In certain embodiments, positioning the multi-layer sensor proximate the downhole element comprises one of positioning an azimuthal array of multi-layer sensors proximate the downhole element; and positioning a downhole tool proximate the downhole element, wherein the multi-layer sensor is wrapped around the downhole tool. In certain embodiments, positioning the multi-layer sensor proximate the downhole element comprises extending a pad from a downhole tool proximate the downhole element, wherein the multi-layer sensor is coupled to the pad. In certain embodiments, the sensor further comprises a second transmitter coupled to a third conformable element; and a second receiver coupled to a fourth conformable element, wherein at least one of the third conformable element and the fourth conformable element is overlaying or being overlaid by at least one of the first conformable element and the second conformable element. In certain embodiments, the first transmitter and the second transmitter are arranged in different orthogonal directions; and the first receiver and the second receiver are arranged in different orthogonal directions. In certain embodiments, the sensor further comprises a second receiver or a second transmitter with portions in both the first conformable element and the second conformable element and with a different orientation than the first receiver and the first transmitter.

In any of the embodiments described in the preceding two paragraphs, the method may further comprise determining a parameter of the downhole element based, at least in part, on the measured response. In certain embodiments, the method may further comprise generating a visualization of the downhole element based, at least in part, on the determined parameter. In certain embodiments, the downhole element comprises at least one of a casing, a borehole, a cement layer outside of the casing, or a subterranean formation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A downhole tool, comprising:
   a tool body; and
   a multi-layer sensor coupled to the tool body, the sensor comprising:
   a first transmitter coupled a first conformable element; and
   a first receiver coupled to a second conformable element, wherein one of the first conformable element and the second conformable element overlays the other of the first conformable element and the second conformable element.

2. The downhole tool of claim 1, wherein the multi-layer sensor is one of:
   wrapped around the tool body; and
   part of an azimuthal array of multi-layer sensors coupled to the tool body.

3. The downhole tool of claim 1, wherein the multi-layer sensor is coupled to a pad extendable from the tool body.

4. The downhole tool of claim 1, wherein the sensor further comprises:
   a second transmitter coupled to a third conformable element; and
   a second receiver coupled to a fourth conformable element, wherein at least one of the third conformable element and the fourth conformable element is overlaying or being overlaid by at least one of the first conformable element and the second conformable element.

5. The downhole tool of claim 4, wherein
the first transmitter and the second transmitter are arranged in different orthogonal directions; and
the first receiver and the second receiver are arranged in different orthogonal directions.

6. The downhole tool of claim 1, further comprising a second receiver or a second transmitter with portions in both the first conformable element and the second conformable element and with a different orientation than the first receiver and the first transmitter.

7. The downhole tool of claim 1, further comprising a protective sleeve covering an outer surface of the multi-layer sensor.

8. The downhole tool of claim 1, further comprising a control unit with a processor and a memory device coupled to the processor, the memory device containing a set of instructions that, when executed by the processor, cause the processor to
generating an electromagnetic signal using the transmitter; and
measuring a response of a downhole element to the electromagnetic signal using the receiver.

9. The downhole tool of claim 8, wherein the set of instructions further cause the processor to
determine a parameter of the downhole element based, at least in part, on the measured response; and
generate a visualization of the downhole element based, at least in part, on the determined parameter.

10. The downhole tool of claim 9, wherein the downhole element comprises at least one of a casing, a borehole, a cement layer outside of the casing, or a subterranean formation.

11. A method for making downhole measurement, comprising:
positioning a multi-layer sensor proximate a downhole element, the multi-layer sensor comprising
a transmitter coupled to a first conformable element; and
a receiver coupled to a second conformable element, one of the first conformable element and the second conformable element overlays the other of the first conformable element and the second conformable element;
generating an electromagnetic signal using the transmitter; and
measuring a response of the downhole element to the electromagnetic signal using the receiver.

12. The method of claim 11, wherein positioning the multi-layer sensor proximate the downhole element comprises one of positioning the multi-layer sensor within the borehole using a wireline or slickline, or positioning the multi-layer sensor within the borehole using a drill string.

13. The method of claim 11, wherein positioning the multi-layer sensor proximate the downhole element comprises one of
positioning an azimuthal array of multi-layer sensors proximate the downhole element; and
positioning a downhole tool proximate the downhole element, wherein the multi-layer sensor is wrapped around the downhole tool.

14. The method of claim 11, wherein positioning the multi-layer sensor proximate the downhole element comprises extending a pad from a downhole tool proximate the downhole element, wherein the multi-layer sensor is coupled to the pad.

15. The method of claim 11, wherein the sensor further comprises
a second transmitter coupled to a third conformable element; and
a second receiver coupled to a fourth conformable element, wherein at least one of the third conformable element and the fourth conformable element is overlaying or being overlaid by at least one of the first conformable element and the second conformable element.

16. The method of claim 15, wherein
the first transmitter and the second transmitter are arranged in different orthogonal directions; and
the first receiver and the second receiver are arranged in different orthogonal directions.

17. The method of claim 11, wherein the sensor further comprises a second receiver or a second transmitter with portions in both the first conformable element and the second conformable element and with a different orientation than the first receiver and the first transmitter.

18. The method of claim 11, further comprising determining a parameter of the downhole element based, at least in part, on the measured response.

19. The method of claim 18, further comprising generating a visualization of the downhole element based, at least in part, on the determined parameter.

20. The method of claim 19, wherein the downhole element comprises at least one of a casing, a borehole, a cement layer outside of the casing, or a subterranean formation.

* * * * *